United States Patent [19]
Alexander

[11] Patent Number: 6,067,452
[45] Date of Patent: May 23, 2000

[54] TECHNIQUE FOR LEAST COST ROUTING FOR MOBILE SATELLITE SYSTEMS EMPLOYING A GSM NETWORK INFRASTRUCTURE

[75] Inventor: Roger K. Alexander, Rockville, Md.

[73] Assignee: Comsat Corporation, Bethesda, Md.

[21] Appl. No.: 08/654,299

[22] Filed: May 28, 1996

[51] Int. Cl.[7] .................................................. H04Q 7/20
[52] U.S. Cl. .......................................... 455/428; 455/12.1
[58] Field of Search .................................. 455/11.1, 12.1, 455/427, 428, 430, 432, 433, 435, 445

[56] References Cited

U.S. PATENT DOCUMENTS

| | | | |
|---|---|---|---|
| 5,173,933 | 12/1992 | Jabs et al. | 455/445 X |
| 5,260,987 | 11/1993 | Mauger . | |
| 5,278,890 | 1/1994 | Beeson, Jr. et al. . | |
| 5,287,541 | 2/1994 | Davis et al. | 455/427 |
| 5,396,543 | 3/1995 | Beeson, Jr. et al. . | |
| 5,448,623 | 9/1995 | Wiedeman et al. . | |
| 5,467,381 | 11/1995 | Peltonen et al. . | |
| 5,509,004 | 4/1996 | Bishop, Jr. et al. | 455/12.1 X |
| 5,528,247 | 6/1996 | Nonami | 342/357 |
| 5,561,836 | 10/1996 | Sowles et al. | 455/12.1 |
| 5,689,568 | 11/1997 | Laborde | 455/12.1 X |

*Primary Examiner*—William G. Trost
*Attorney, Agent, or Firm*—Sughrue, Mion, Zinn, Macpeak & Seas, PLLC

[57] ABSTRACT

A system and method for achieving least cost call routing (i.e., shortest terrestrial path between mobile terminal and a fixed terminal) for a mobile communications system by integrating a cellular satellite communications system with an existing GSM network to form an extended satellite GSM system and an enhanced satellite GSM system. The extended satellite GSM system incorporates the advantages facilitated by the GSM network with the extended coverage capability of the mobile satellites, and achieves least cost call routing by registering a mobile terminal with one designated gateway (i.e., home gateway). In accordance with another embodiment, the enhanced satellite GSM system achieves least cost call routing for all mobile terminal originated and terminated calls by minor modifications to the mobile terminal and home location register. The resulting arrangement has minimal impact on the GSM network system operation because the modification incorporates standard GSM procedures and protocols and implements data stored at the mobile terminal. Specifically, the resulting arrangement makes no modification to the operation of the mobile switching center or visitor location register (MSC/VLR) used within the GSM network.

12 Claims, 7 Drawing Sheets

FIG. 9

| COUNTRY | COUNTRY CODE | AREA/CITY CODE | NEAREST GATEWAY ID |
|---|---|---|---|
| JAPAN | 81 | 3<br>45<br>75 | A<br>A1<br>A2 |
| GREENLAND | 299 | 2 | D |
| THAILAND | 66 | 2<br>53 | F<br>F1 |
| COLUMBIA | 57 | 1 | E |
| U.S.A. | 1 | 703<br>202<br>404 | B<br>B1<br>B5 |
| U.K. | 44 | 171<br>181 | H<br>H2 |
| DEFAULT | --- | --- | W(DEFAULT) |

TECHNIQUE FOR LEAST COST ROUTING FOR MOBILE SATELLITE SYSTEMS EMPLOYING A GSM NETWORK INFRASTRUCTURE

FIELD OF THE INVENTION

The present invention is directed to the field of mobile satellite systems. Specifically, the present invention relates to a method and apparatus for creating a shortest terrestrial path between communicating parties to yield a least cost call routing for a mobile terminal in relation to a fixed terminal.

BACKGROUND OF THE INVENTION

The Global System for Mobile communications (GSM) system is a set of ETSI (European Telecommunications Standards Institute) standards specifying the infrastructure for a cellular terrestrial communications system. Specifically, referring to FIG. 1, the ground network of the GSM system is constituted by a number of mobile switching centers (MSC) 1b–4b with associated visitor location registers that act as gateways 1–4 between the mobile terminal and a public switched telephone network (PSTN) 7 or other terrestrial networks. A single logical home location register (HLR) 1c, 3c serves mobile users accessing service through multiple mobile switching centers.

A cellular satellite communications system, when integrated with the existing GSM system's infrastructure to form a satellite GSM system, utilizes the mobility, network interworking, and service management capabilities developed for the cellular terrestrial communication system. As illustrated in FIG. 1, a simple integration results in a basic satellite GSM system which uses the GSM cellular technology standard to provide the ground segment infrastructure for the cellular satellite communications system 8. In this basic satellite GSM system, since only the radio access has been extended through a satellite repeater, each of the mobile switching centers 1b, 2b, 3b, and 4b operating within the satellite coverage area 6 of the basic satellite GSM system 8 is assigned to a non-overlapping domain of coverage. Therefore, as indicated by the differently shaded areas in FIG. 1, location areas of the basic satellite GSM system 8 are defined according to the regional coverage assigned to a particular mobile switching center 1b–4b.

Additionally, each of the gateways 1, 2, 3 and 4 supports a satellite RF equipment and land earth station (LES) subsystems 1d, 2d, 3d, and 4d for accessing the space segment. System control is distributed among the mobile switching centers 1b, 2b, 3b, and 4b within the satellite coverage. The mobile switching centers incorporate associated visitor location registers (VLR) 1a, 2a, 3a and 4a. Additionally, home location registers 1c and 3c, as part of the GSM mobility management system, are implemented at one or more gateways 1 and 3 depending on the number of subnetworks supported.

As a mobile terminal moves from one cell to another cell within the satellite coverage 6 of the basic satellite GSM system, its location is updated and registered according to the location areas identified (i.e., via the system control channels). If the mobile terminal remains within the defined coverage of a particular gateway, its location is updated and registered only at that particular gateway. However, if the mobile terminal moves from the coverage area of one gateway to the coverage area of another gateway, the location of the mobile terminal is updated and registered at the new gateway, and a new serving visitor location register is conveyed to the home location register.

One of the problems in the basic satellite GSM system of FIG. 1 is that it does not utilize the extended coverage capability of the satellite. As a result, calls to and from the mobile terminal are not always completed through the most efficient path. Under the standard GSM procedures, calls to and from the mobile terminal are only completed through the gateway at which the terminal is currently registered. For instance, as illustrated in FIG. 2, a call from the fixed terminal 10 to the mobile terminal 18 must always be routed by terrestrial means (PSTNs) 11 and 14 to the gateway (MSC/VLR) 16 at which the mobile terminal is registered. Therefore, even if the call from the fixed terminal 10 is delivered to the one of the mobile switching centers (e.g., home gateway 13) within the coverage of the satellite 17, the call must be terrestrially routed to the mobile switching center (e.g., visiting gateway 16) at which the mobile terminal is registered because the standard GSM procedure 19 allows only the registered mobile switching center 16 to access the mobile terminal 18 directly.

For a mobile originated call to a fixed terminal, a similar routing inefficiency results. If the mobile terminal originates a call to a fixed terminal, the call is established through the registered mobile switching center. For instance, even if a call destined to a fixed terminal is connected to a mobile switching center other than the registered mobile switching center, the call connection is not established through the mobile switching center at the gateway which is nearest to the fixed user. Instead, the mobile terminal completes the call through the registered gateway from which it is further routed terrestrially to the destined fixed terminal. For instance, as illustrated in FIG. 2, a call from the mobile terminal 18 to the fixed terminal 10, instead of directly routed from the mobile terminal 18 to the gateway 13 via the satellite 17, is routed from the mobile terminal 18 to the gateway 16 via the satellite 19, and then to the gateway 13 via terrestrial means. In short, although the satellite in the cellular satellite communications system has a wide coverage area, the mobility management procedures of the basic satellite GSM system prevent this capability from being utilized. As a result, the least cost routing for the mobile terminal originated and terminated calls is not achieved.

SUMMARY OF THE INVENTION

It is therefore an object of the present invention to achieve least cost routing for mobile satellite systems employing a GSM network infrastructure.

It is a further object of the present invention to incorporate the advantages facilitated by the GSM network with extended satellite coverage capability.

It is a further object of the present invention to optimize call routing by using a switching center with a shortest terrestrial path in relation to a fixed terminal.

It is still another object of the present invention to leave the design and operation of the standard GSM elements undisturbed with respect to their operation and protocol interaction with other standard GSM system elements. Specifically, the minor modification in the home location register does not affect its standard interaction with other GSM system elements.

These and other objects of the present invention can be realized by providing a method and corresponding apparatus for communication between a mobile terminal and a fixed terminal. In accordance with a first embodiment of the invention, although the mobile terminal, irrespective of its location within the satellite coverage, can register with any one of the mobile switching centers located within the satellite coverage, a home mobile switching center is selected for the mobile terminal based on a likelihood that home mobile switching center will be closest to the fixed terminal from which the calls originate or terminate. The mobile terminal thus will be registered with the home MSC even when the mobile terminal moves from one satellite coverage area to another.

In accordance with a second embodiment of the invention, the mobile terminal has stored within its memory a territorial look-up table, containing country codes and regional codes. When the mobile terminal initiates a call to a fixed terminal, one of the mobile switching centers is selected according to the fixed terminal's telephone number, based on the territorial look-up table. Before the call is completed, the location of the mobile terminal is registered with the selected MSC.

BRIEF DESCRIPTION OF THE DRAWINGS

The present invention will be understood more clearly from the following description of preferred embodiments when taken in conjunction with the accompanying drawings, wherein:

FIG. 9 is a table of values in the mobile terminal.

DETAILED DESCRIPTION OF THE PREFERRED EMBODIMENTS

Figure 1:
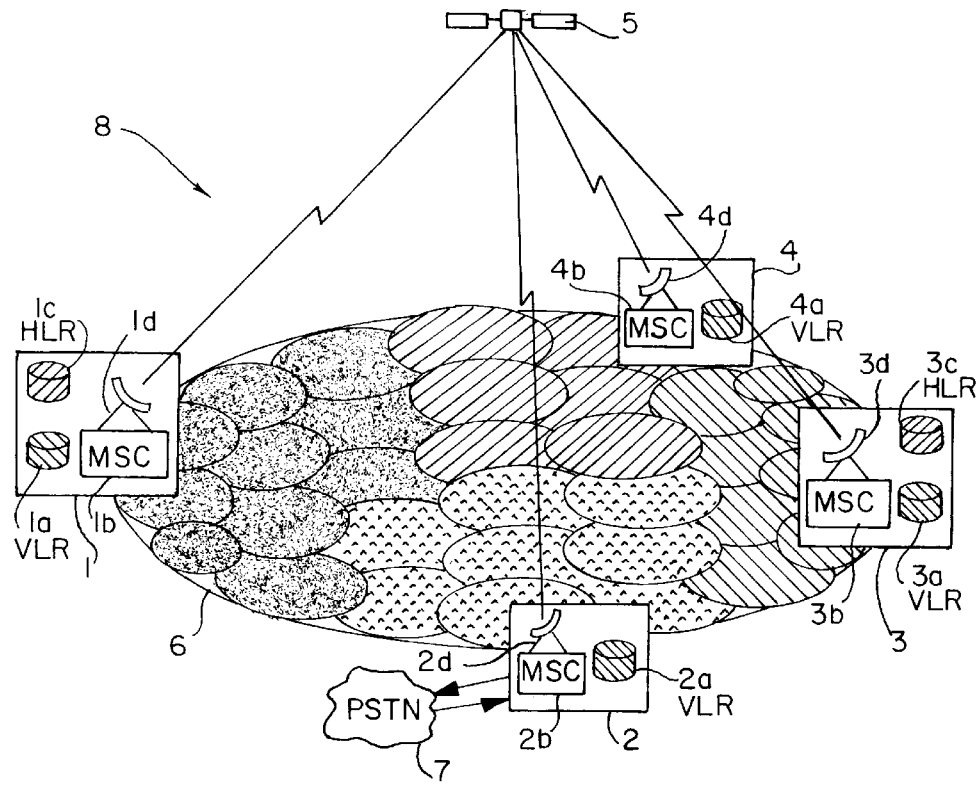
FIG. 1 is a schematic illustration of a basic satellite GSM system.
Figure 3:
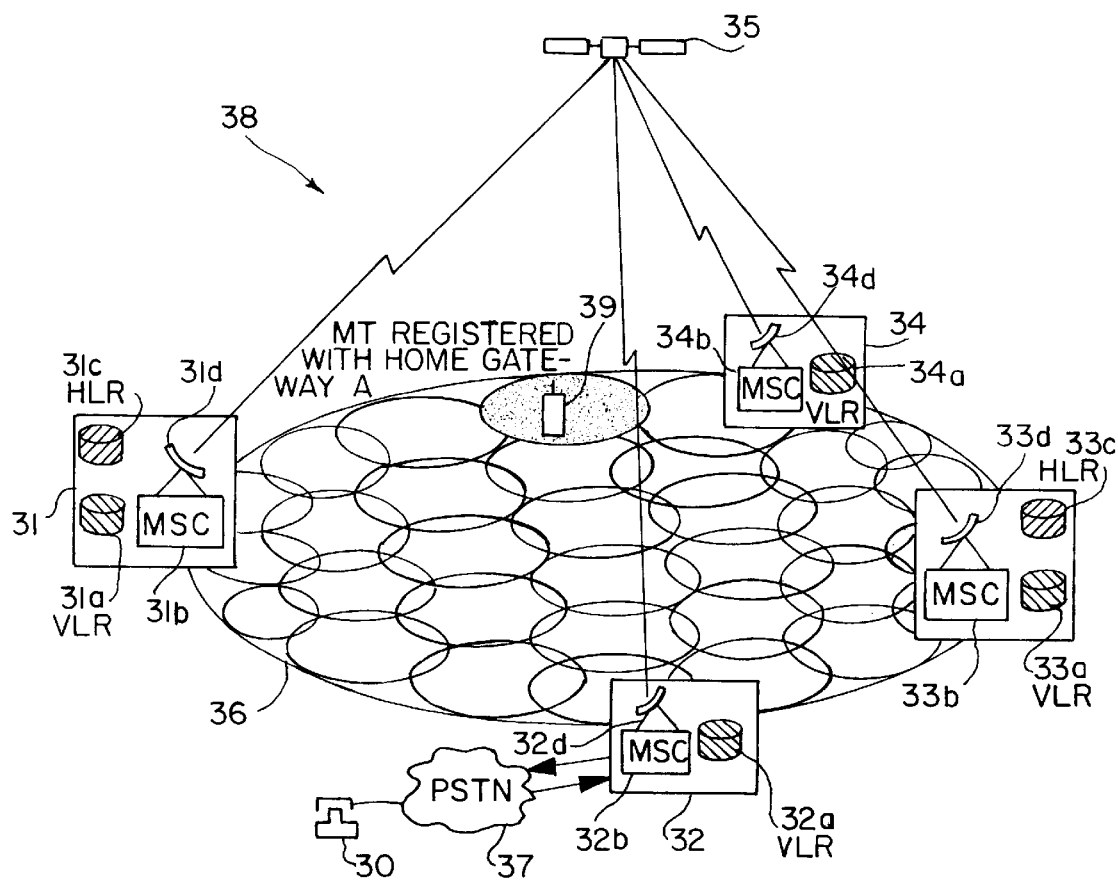
FIG. 3 is a schematic illustration of an extended satellite GSM system according to a first exemplary embodiment of the invention.

According to one embodiment of the invention as shown in FIG. 3, least cost routing is achieved by integrating a cellular satellite communications system with the existing GSM system's infrastructure to form an extended satellite GSM system 38. The extension of the basic satellite GSM system of FIG. 1 is achieved by utilizing the wide area coverage 36 of the satellite system, while allowing for a similar use of the GSM network system infrastructure. In this way, each of the mobile switching centers 31b, 32b, 33b, and 34b, and each of associated visitor location registers 31a, 32a, 33a, and 33a of the extended satellite GSM system 38 serves the entire satellite coverage area 36. The full end-to-end link coverage of the satellite is exploited by allowing each of the gateways (MSC/VLRs) 31–34, which respectively supports land earth station (LES) subsystems 31d, 32d, 33d, and 34d, to independently control all of the system coverages. This extended satellite GSM system 38 does not affect the GSM network operation, but differs fundamentally from the basic satellite GSM system 8 of FIG. 1, which has gateways 1–4 that control non-overlapping service areas.

Moreover, the extended satellite GSM system 38 utilizes the wide coverage capability of the satellite, and achieves the least cost routing by designating a gateway (MSC/VLR) 32 as the home gateway. Specifically, the mobile terminal updates its location with the designated mobile switching center 32b in the home gateway 32. The home gateway 32 has its own population of mobile subscribers who are registered in a particular visitor location register. As the mobile terminal 39 changes cell coverage area, its location information is updated at the visitor location register 32a of the home gateway 32. Because the location area of the home gateway 32 corresponds to the entire coverage area 36, only the registration status of the mobile terminal 39 are conveyed to the home location register 33c, and the home location register 33c maintains a pointer to the home gateway (MSC/VLR) 32 for each of the mobile subscribers.

Because all calls from the mobile terminal 39 to the fixed terminal 30 via the mobile terminal's home gateway 32 are linked without terrestrial rerouting, least cost routing is achieved. That is, regardless of the mobile terminal's current registered location, all calls that are directed toward a fixed terminal 30 which is served by a home gateway 32 are directly delivered without further terrestrial rerouting by the home mobile switching center 33c. Additionally, since the extended satellite GSM system 38 is assumed to have a single PSTN-based directory number which is associated with the PSTN network within which the home gateway is located, calls originating from the fixed terminal 30 are directly routed by the PSTN to the home gateway 32 and delivered to the mobile terminal 39 without any further terrestrial rerouting, thereby achieving least cost routing for the mobile terminated calls.

In the extended satellite GSM system 38, the home gateway 32 is selected based on a regional association, or based on a calling traffic profile of the mobile terminal 39. The statistics for terrestrial mobile communications traffic indicate that the use of an appropriate home mobile switching center automatically yields a least cost call routing for the majority of calls to and from the mobile terminal 39.

Certain limitations exist in the extended satellite GSM system 38 according to the first embodiment of the invention. For instance, the first embodiment does not support least cost call routing for mobile originated calls that are directed to a fixed terminal not connected to the home gateway 32. Specifically, if a call is made to a fixed terminal in another region or country, the optimum path requires that the call be completed through an alternate gateway that provides a more direct connection to the desired fixed terminal. Additionally, since the mobile terminal's directory number is based on a nationally or internationally assigned directory number, calls originated from a fixed terminal are always routed terrestrially to the home gateway 32. For call originating outside the home region, this necessitates an additional terrestrial routing to the home gateway (MSC/VLR) 32 before reaching the mobile terminal 39 via the satellite system. Indeed, even with the uniquely assigned directory number that allows the PSTN to route the call to the registered gateway, the call must still be terrestrially rerouted to the home gateway for connection to the mobile terminal via the satellite system.

The aforementioned limitation is removed, based on a second embodiment of the invention, as now will be described with reference to FIGS. 4, 5, and 6. In accordance with this second embodiment, the mobile terminal and home location register are modified to form an enhanced satellite GSM system 48. The enhanced satellite GSM system 48 allows for least cost call routing for all mobile terminal originated calls, and has minimal impact on the GSM network system operation, since it incorporates standard GSM procedures and implements data which are stored at the mobile terminal 49. Similarly, the home location register 41c modification allows for least cost call routing for all mobile terminal terminated calls, and has minimal impact on the GSM network system operation since it involves existing data storage capability of home location register 41a.

Figure 4:
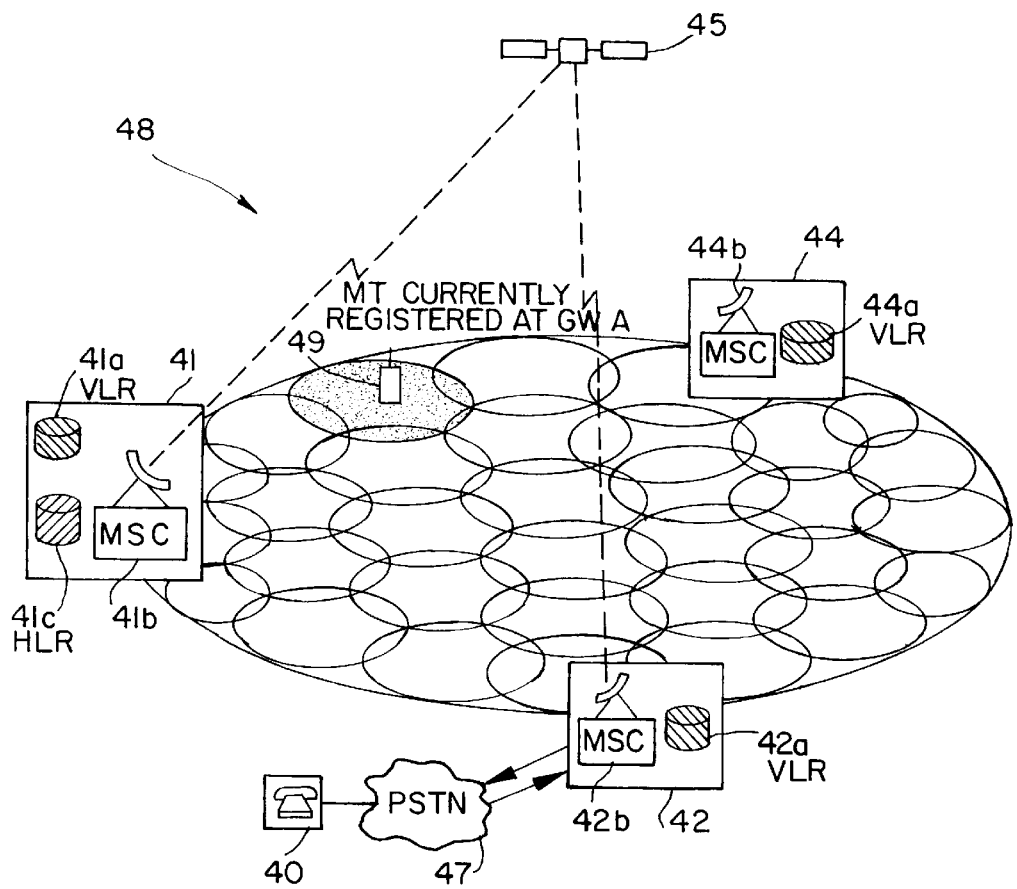
FIG. 4 is a schematic illustration of an enhanced satellite GSM system according to a second exemplary embodiment of the invention.
Figure 5:
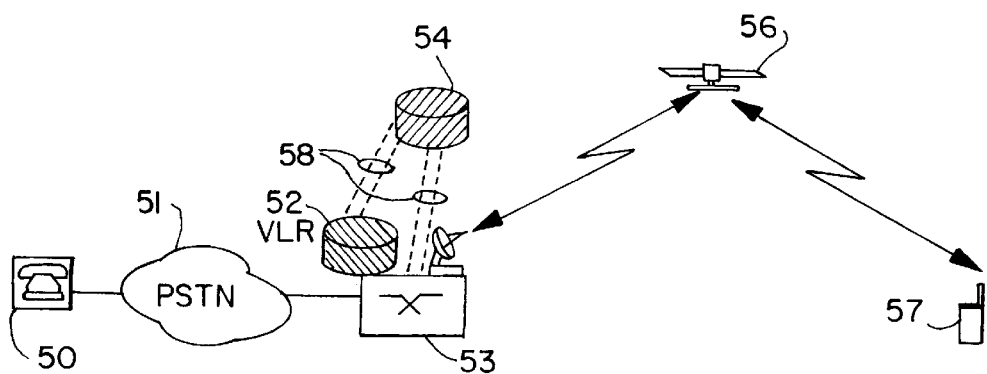
FIG. 5 is a schematic illustration of a mobile terminated call routing in the extended satellite GSM system.
Figure 8:
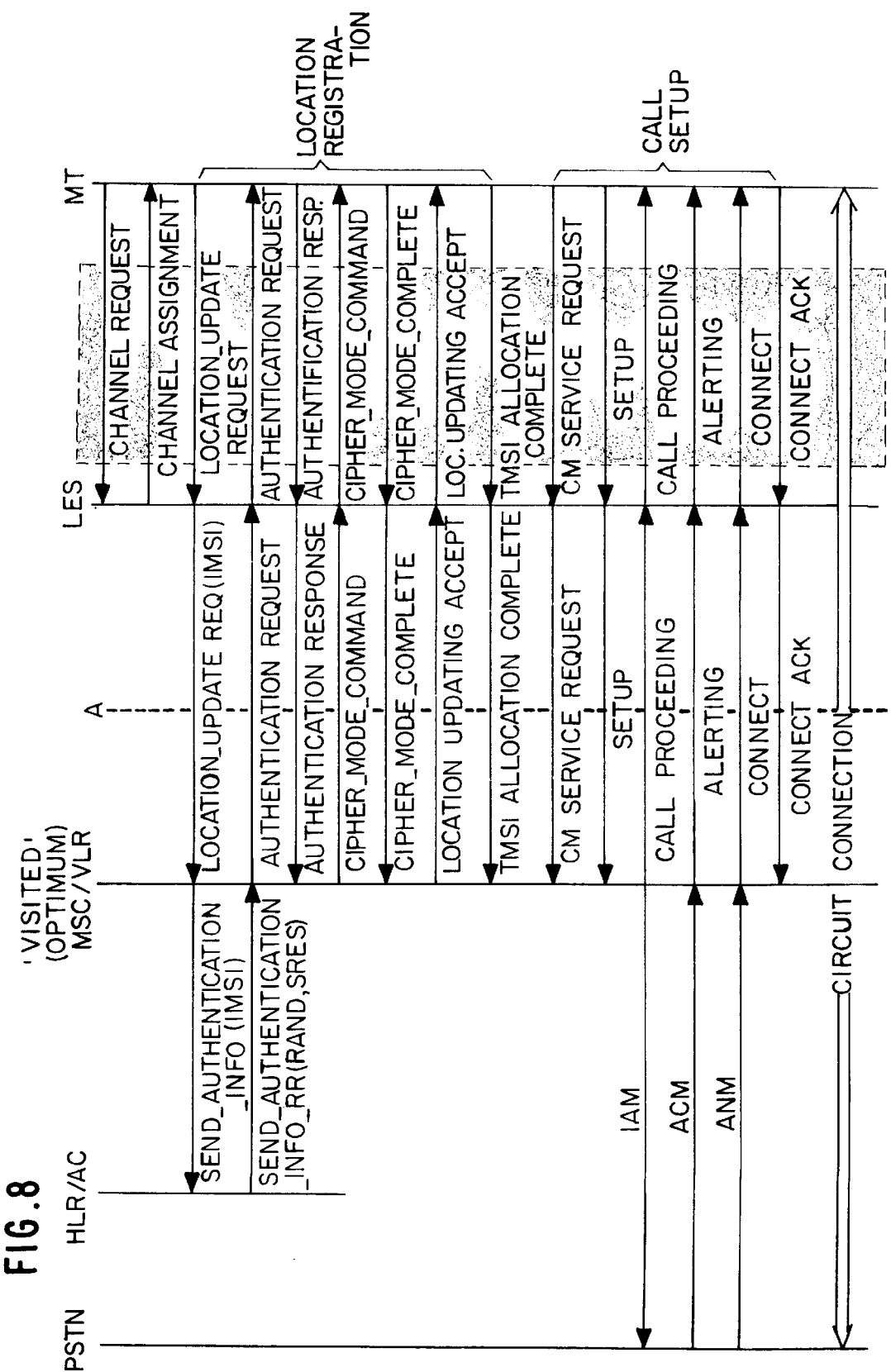
FIG. 8 is a diagram illustrating a standard GSM signaling procedure for location registration and call setup.

Specifically, as illustrated in FIG. 4, the enhanced satellite GSM system 48 can record the signaling procedures within the mobile terminal 49 so that the mobile terminal 49 initiates a location registration to an appropriate gateway (MSC/VLR) (e.g., gateway 44) prior to transmitting the call setup request. Once the mobile terminal initiates the dialing sequence, the mobile terminal determines the region to which the call is directed. This is determined from the initial digits dialed. Using a data table stored in its non-volatile memory (See FIG. 8), the mobile terminal 49 is able to initiate location registration as soon as an appropriate gateway (MSC/VLR) (e.g., gateway 44) is identified from the dialed digits. For instance, according to FIG. 9, gateway A (in Tokyo, Japan) is selected when numbers "++813" are dialed as the initial digits, whereby prefix "++" designates international access and prefix "+" designates national access. Accordingly, all calls to fixed terminals located outside the country of the mobile terminal must be preceded by the prefix "++" followed by the country code and regional code. Similarly, all calls to fixed terminals located within the country of the mobile terminal must be preceded by the prefix "+" followed by the regional code. The mobile terminal 49 maintains a mapping of country and regional codes to determine the choice of nearest gateways 41, 42 and 44. This mapping information is stored in the mobile terminal 49 and delivered over the air to the mobile terminal 49 as part of system control overhead information, thus providing greater flexibility in configuring the network and supporting the changing status of network mobile switching centers. As a result, the call routing and location registration (when necessary) to the nearest gateway (i.e., gateway 42) is supported by the appropriate directory numbering system. The standard GSM signaling procedure for the location registration and call setup is illustrated in FIG. 8.

The mobile terminal 49 initiates the location registration as soon as the requirement for new gateway registration is identified. The registration process is performed in parallel with the dialing and therefore has a reduced impact on the call setup performance. Once the registration is completed, the mobile terminal 49 initiates a call setup request with the dialed digits. This procedure has no impact on the GSM network infrastructure, since standard GSM procedures are reused. However, to increase efficiency, the radio control system of the enhanced satellite GSM system is used to maintain the assigned registration channel for the setting up of the call. This new location registration is identified by the addition of various parameter information within the access request. When a mobile terminal registers at a non-home MSC, the visited mobile switching center completes the necessary VLR-HLR mobility management signaling procedures in accordance with standard GSM operation. The mobile terminal is registered at the visited mobile switching center with its location canceled from the home gateway VLR.

The enhanced satellite GSM system achieves complete flexibility in the ability to support least cost call routing for all mobile originated calls. The concept of a home gateway according to the first preferred embodiment is eliminated, and the mobile terminal can be registered at any MSC/VLR in accordance with the optimum path for a mobile originated or terminated call. As a result, calls from the mobile terminal 49 are always routed to the nearest gateway (e.g., 42). For instance, as illustrated in FIG. 5, a call from the mobile terminal 57 to the fixed terminal 50 is routed via satellite 56, gateway (MSC/VLR) 53, and PSTN 51. Since the gateway (MSC/VLR) 53 is the nearest gateway to the fixed terminal 50, the terrestrial routing via PSTN 51 is minimized, and least cost call routing is thereby achieved.

Figure 2:
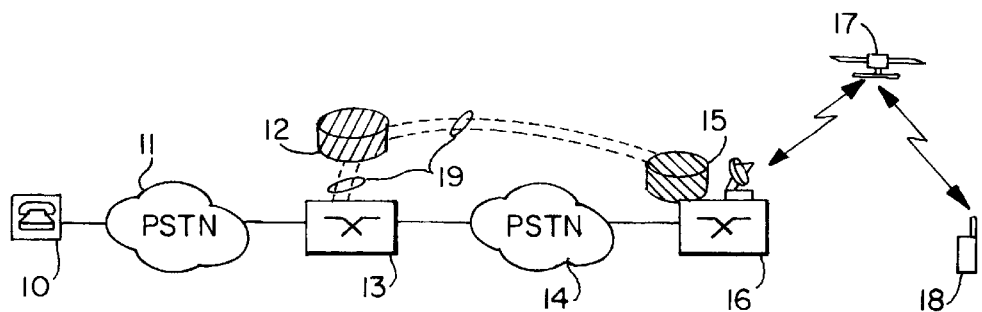
FIG. 2 is schematic illustration of a mobile terminated call routing in the basic satellite GSM system.

The enhanced satellite GSM system also achieves a least cost call routing for all mobile terminated calls. In FIG. 4, the enhanced satellite GSM system 48 implements a modified mobile terminated call handling procedure in the home location register. As described herein above, a call request arrives at a gateway (MSC/VLR) (e.g., gateway 42) other than the one at which the mobile is currently registered (e.g., gateway 44). In a standard GSM terrestrial mobile system, though the home location register (HLR) interrogation is performed by the originating mobile switching center 42, the current registration of the mobile terminal would require that the call first be rerouted to the registered mobile switching center 44 for a call setup to the mobile terminal. As a result, additional terrestrial routing is necessary, and the system thus fails to take advantage of the coverage capability of the satellite 45. Call rerouting is necessary, since the mobile's registration and profile data are at the registered gateway (MSC/VLR) 44 (see FIGS. 2 and 7).

Therefore, to ensure the least cost routing for the fixed terminal 40 originated call to a mobile terminal 49, the enhanced satellite GSM system 48 allows the mobile terminal's services profile information to be relayed to the originating gateway (MSC/VLR) 42 so that the call is directly completed to the mobile terminal 49 without further terrestrial rerouting. This on-demand location registration enables a least cost routing for all mobile terminated calls in the enhanced satellite GSM system 48.

Figure 6:
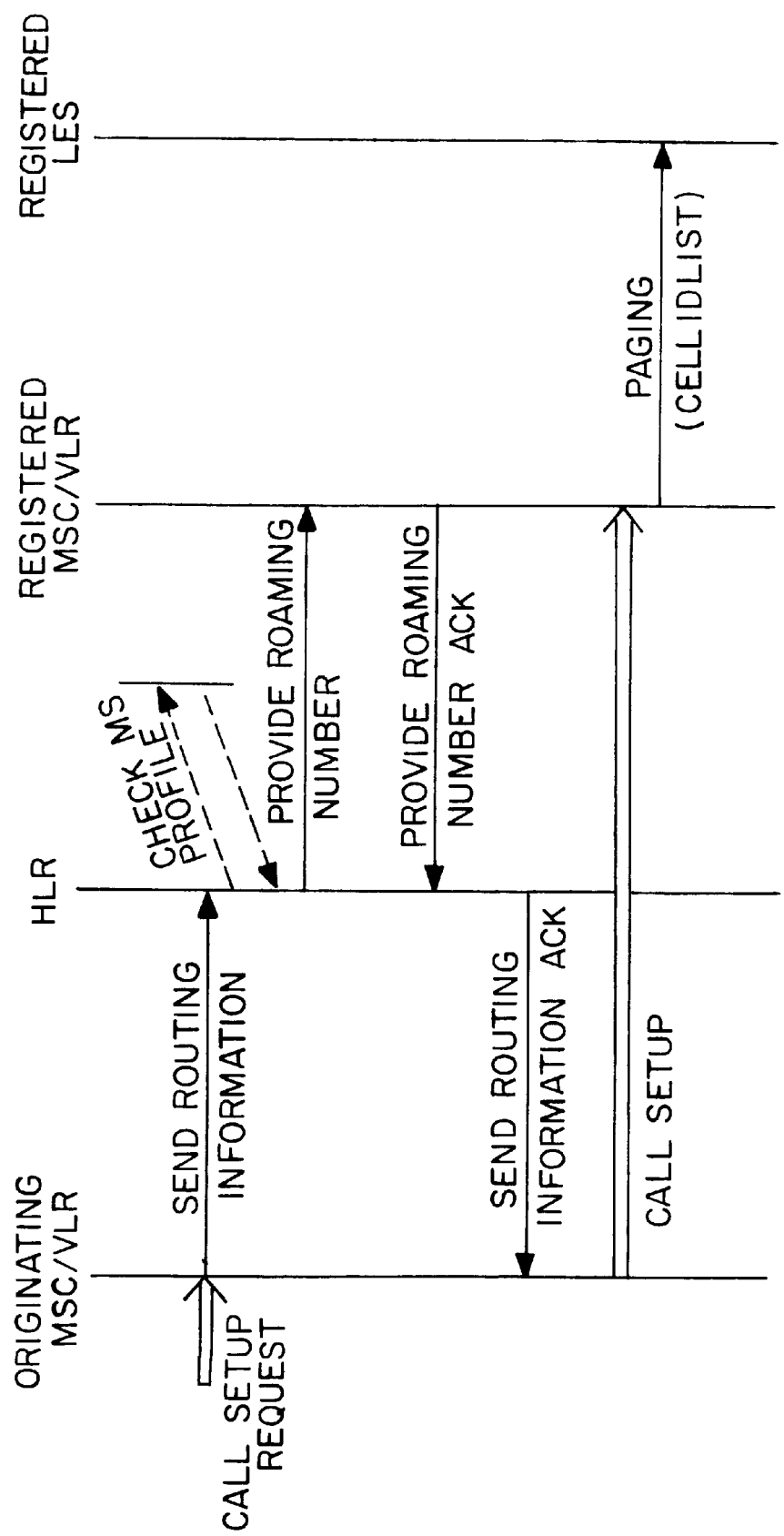
FIG. 6 is a diagram illustrating a standard GSM signaling procedure.

Referring to FIGS. 4 and 6, signaling procedures which involve the on-demand location registration during mobile terminated calls are invoked. The signaling process is started by a call setup request arriving at a gateway (MSC/VLR) (e.g., gateway 42) which is different from the gateway (MSC/VLR) (e.g., gateway 44) at which the mobile terminal 49 is currently registered. A request for routing information is sent from the mobile switching center 42b in the originating gateway (MSC/VLR) 42 to the home location register 41c. This would normally be followed by a request to provide a roaming number being sent from the home location register 41c to the gateway (MSC/VLR) 44 at which the mobile terminal is registered (see FIG. 6). Instead, the modification made to the signaling procedure at the home location register 41c initiates a request to provide the roaming number not from the registered gateway (MSC/VLR) 44, but rather back to the gateway (MSC/VLR) 42 that originated the request (see FIG. 7). From that point the signaling procedures continue as in the standard GSM case. At the originating gateway (MSC/VLR) 44, the request for a roaming number for the unregistered mobile initiates a standard GSM VLR restoration procedure.

The restoration procedure involves setting up of an empty subscriber's record at the visitor location register 42a and the return of a roaming number to the requesting home location register 41c. Confirmation flags are set in the visiting location register 42a pending the establishment of a subsequent contact with the home location register 41c and pending a contact with the mobile terminal over the radio interface. Once the home location register 41c responds to the restoration of data request and the mobile terminal is contacted, the new subscriber's data in the visitor location register 42a is fully established and confirmed. As indicated in FIGS. 5 and 6, the home location register 41c is required to cancel the location information in the previously registered visitor location register (e.g., 44a). This is accomplished using standard procedure as for the case of a mobile terminal actively changing location areas. The home location register 41c signals this cancellation request upon receipt of the restored data acknowledgment from the originating visitor location register 42a.

Figure 7:
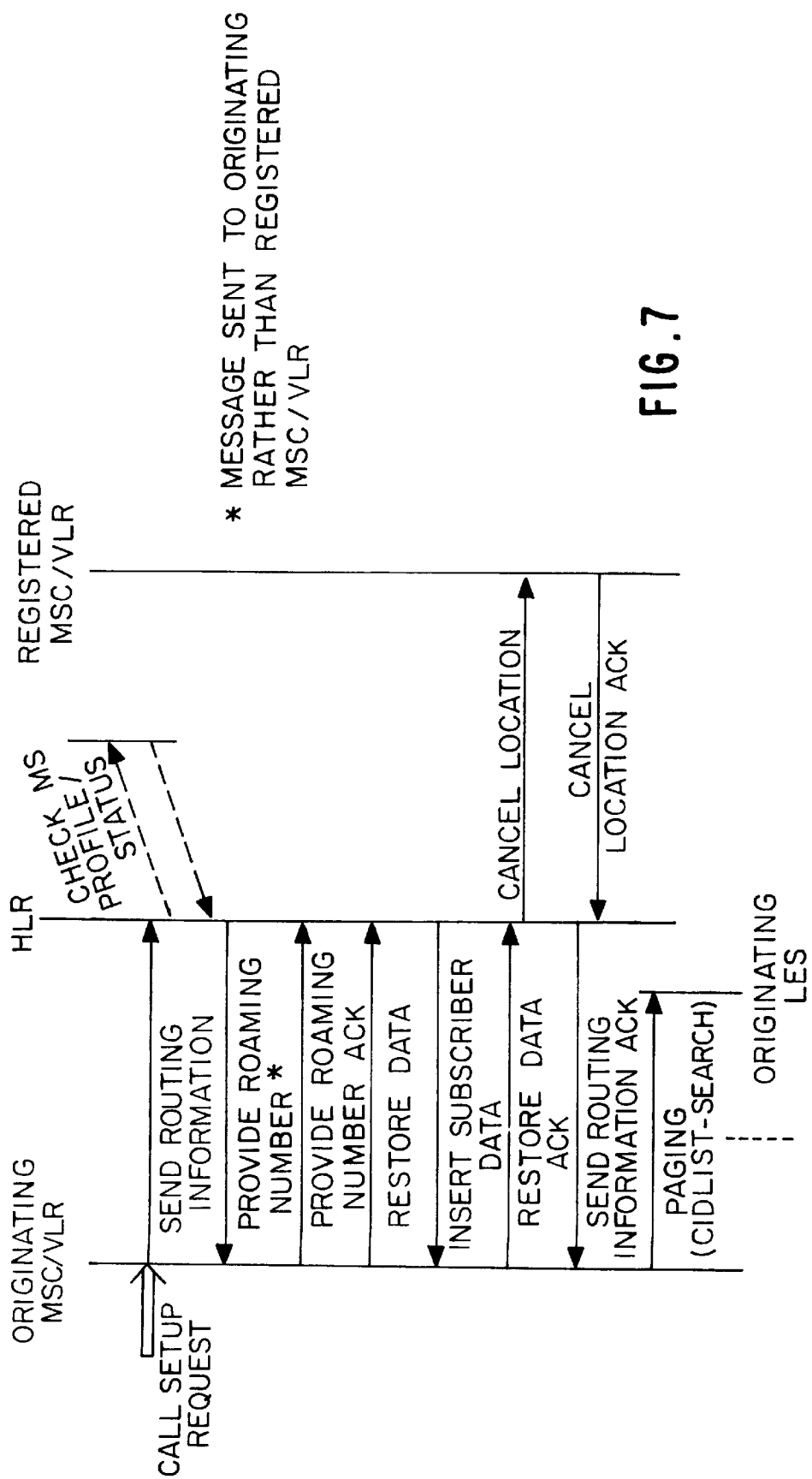
FIG. 7 is a diagram illustrating a GSM signaling procedure according to the second exemplary embodiment of the invention.

To ensure that this procedure does not lead to conflict in the event that the mobile terminal is engaged in a call, the current activity status of the mobile terminal is first checked (see FIG. 7). To check the status of the mobile terminal 49, a modification must be made to the home location register 41c so that it accesses the current status of the mobile terminal 49. That is, the home location register 41c is modified to contain the current activity status as part of the data stored in a record field at the home location register. Alternatively, the current activity status is stored elsewhere in the enhanced satellite GSM system 48, and later accessed from the home location register 41c. Additionally, the current activity status of the mobile terminal 49 reveals an idle or busy status, which may be in the form of a binary 0 representing an idle state and a binary 1 representing a busy state.

In implementing the on-demand location updating using the GSM restoration approach, another item of information other than the current activity status of the mobile terminal 49 is required for the call setup completion. Specifically, to efficiently page the mobile terminal 49, its precise location must be known. However, this information is not available as part of the restoration procedure because it is stored in the visitor location register 44a at which the mobile terminal is actively registered. Therefore, a portion of the change made to the home location register includes storing and maintaining this information as part of the subscriber's data (i.e., along with the current activity status of the mobile terminal 49) within the home location register. This information is made independently available to the LES subsystem involved in the actual paging of the mobile terminal. Additionally, the LES subsystem is responsible for determining the status of the mobile terminal and relaying this status information to the home location register. This is achieved by mapping the identifications of the mobile terminal to all active channel resources.

To avoid potential conflict with the handling of supplementary and other service requests, particularly when an active connection to the mobile terminal exists, the enhanced satellite GSM system allows the home location register to access the activity status information of the mobile terminal in handling all requests for mobile terminated services. When coupled with the service profile information stored at the home location register, the home location register can determine the appropriate call handling. For example, unconditional call forwarding can still be provided in the standard manner. That is, in the case of a service such as call waiting, the home location register can detect that the mobile terminal is engaged in a call and execute standard GSM procedures to have the call setup to the serving gateway (MSC/VLR), with a terrestrial path created from the originating mobile switching center to the current serving mobile switching center.

For services that are accessed through mobile terminal originated call, there are no impacts from the enhanced satellite GSM system. Since the mobile terminal actively registers prior to service initiation, call handling is carried out as in the case of a mobile moving from one location area to another.

While specific embodiments of the invention have been described herein, it will be apparent to those of working skill in this technological field that other modifications may be made within the scope of the invention. The full measure of the invention will be apparent from the following claims.

What is claimed is:

1. In a mobile satellite communications system employing a global system for mobile communications (GSM) network, said GSM network comprising a satellite and a plurality of gateways, each of said gateways comprising a mobile switching center (MSC) and a land earth station (LES) subsystem, a method of achieving least cost call routing in said mobile satellite communications system for calls between a mobile terminal and a fixed user terminal, said method comprising the following steps:

selecting, as a home MSC for said mobile terminal, one of said mobile switching centers based on a likelihood that said home mobile switching center will be closest to said fixed user terminal, so as to register said mobile terminal with said home MSC even when said mobile terminal moves from one area covered by said satellite to another area covered by said satellite;

maintaining registration of said mobile terminal with said home MSC wherein said home MSC for each mobile terminal is selected based on a geographical relationship between said home MSC and said fixed user terminal, which maintains registration of said mobile terminal; and maintaining a record of each home MSC for each mobile in a home location register (HLR) and identifying a visitor location register (VLR) of the current location of each mobile assigned to each of said mobile switching centers.

2. In a mobile satellite communications system employing a global system for mobile communications (GSM) network, said GSM network comprising a satellite and a plurality of gateways, each of said gateways comprising a mobile switching center (MSC) and a land earth station (LES) subsystem, a method of achieving least cost call routing in said mobile satellite communications system for calls between a mobile terminal and a fixed user terminal, said method comprising the following steps:

storing a territorial look-up table, containing country codes and regional codes, in a mobile terminal;

upon initiation of a call from said mobile terminal to said fixed user terminal, selecting one of said mobile switching centers according to a telephone number of said fixed user terminal, based on said territorial look-up table; and before said call is completed, registering a location of said mobile terminal with said selected MSC.

3. The method of achieving least call routing in said mobile communication system for calls between a mobile terminal and a fixed user terminal according to claim 2, further comprising the step of maintaining registration of said mobile terminal with said selected MSC based on said call.

4. In a mobile satellite communications system employing a global system for mobile communications (GSM) network, said GSM network comprising a satellite and a plurality of gateways, each of said gateways comprising a mobile switching center (MSC) and a land earth station (LES) subsystem, at least one of said gateways further comprising a home location register (HLR), a method of achieving least cost call routing in said mobile satellite communications system for calls between a mobile terminal and a fixed user terminal, said method comprising the following steps:

modifying said HLR by expanding record fields of said HLR to include a current location of said mobile terminal and activity status of said mobile terminal;

performing a network re-registration of a location of said mobile terminal at an originating gateway not previously registered with said location of said mobile terminal using a GSM restoration procedure based on said current activity status of said mobile terminal; and completing call setup to said mobile terminal from said originating gateway based on said current location stored in said HLR.

5. The method of achieving least call routing in said mobile communication system for calls between a mobile terminal and a fixed user terminal according to claim 4, further comprising the step of maintaining registration of said mobile terminal with said originating gateway not previously registered with said location of said mobile terminal based on said current activity of said mobile terminal.

6. A mobile satellite communications system comprising:

a plurality of terrestrial stations connected to fixed user terminals via terrestrial links, each terrestrial station including RF equipment for communicating with mobile terminals via a satellite, at least one of said terrestrial stations having a home location register (HLR) for storing home registration information of mobile terminals in accordance with a standardized global system for mobile communications (GSM) mobile system protocol, and routing means for routing a call from a particular mobile terminal to a particular fixed user terminal through one of said terrestrial stations even when said particular mobile terminal is closer to a different one of said terrestrial stations available for routing said call;

modifying means for expanding record fields of said HLR to include a current location of said particular mobile terminal and activity status of said particular mobile terminal; and re-registration means for re-registering a location of said particular mobile terminal at said one of said terrestrial stations.

7. A mobile satellite communications system according to claim 6, wherein said one of said terrestrial stations is the terrestrial station closest to said particular fixed user terminal.

8. A mobile satellite communications system according to claim 6, wherein said routing means routes all calls from said particular mobile terminal through said one terrestrial station regardless of the location of said particular mobile station in a coverage zone and regardless of the fixed user terminal being called.

9. A mobile satellite communications system according to claim 6, wherein said routing means includes means for changing the terrestrial station through which calls from said particular mobile terminal are routed.

10. A mobile satellite communications system according to claim 6, wherein said routing means routes calls from said particular mobile terminal to a called fixed user terminal through a terrestrial station selected in accordance with proximity of said terrestrial station to the called fixed user terminal, said terrestrial station selected based on a predetermined unique number identifying an address of said called fixed user terminal.

11. A mobile terminal equipment for use in a mobile satellite communications system;

said system comprising:
at least first and second terrestrial stations connected to fixed user terminals via terrestrial links, each terrestrial station including RF equipment for communicating with mobile terminals via a satellite;

said equipment including:
means for re-registering and selecting a particular one of said terrestrial stations through which to route a call from said mobile terminal to a particular fixed user terminal in accordance with the location of said fixed user terminal.

12. The mobile satellite communication system as claimed by claim 6, wherein registration of said location of said particular mobile terminal at said one of said terrestrial stations is maintained based on said activity status of said particular mobile terminal and routing of said call from said particular mobile station and to said particular fixed user terminal.

* * * * *